United States Patent [19]

Peterson et al.

[11] Patent Number: 5,630,891
[45] Date of Patent: May 20, 1997

[54] PNEUMATIC IN-LINE SKATE WHEEL

[75] Inventors: Tom Peterson; Neal Piper, both of Huntington Beach, Calif.

[73] Assignee: The Hyper Corporation, Huntington Beach, Calif.

[21] Appl. No.: 354,374

[22] Filed: Dec. 12, 1994

[51] Int. Cl.$^6$ ............................................. A63C 17/22
[52] U.S. Cl. ......................... 152/165; 152/327; 152/452; 152/384; 152/511; 152/DIG. 18; 280/11.22; 301/5.3
[58] Field of Search ........................ 152/7, 9, 165, 152/166, 325, 327, 320, 322, 452, 302, 344.1, 345.1, 384, 501, 511, DIG. 18; 301/5.3, 35.51; 280/11.22, 11.23

[56] References Cited

U.S. PATENT DOCUMENTS

| 240,812 | 5/1881 | Coleman. | |
|---|---|---|---|
| 330,630 | 11/1885 | Smith | 301/5.3 |
| 988,533 | 4/1911 | Zverina. | |
| 1,244,209 | 10/1917 | Hickman | 152/166 |
| 1,817,356 | 8/1931 | Fisher | 152/452 |
| 2,068,947 | 1/1937 | Frank. | |
| 2,073,708 | 3/1937 | Parrish | 152/9 |
| 2,262,714 | 11/1941 | Ware | 301/5.3 |
| 2,665,521 | 1/1954 | Ford. | |
| 3,877,710 | 4/1975 | Nyitrai | 280/11.23 |
| 4,310,042 | 1/1982 | Wyman et al. | 152/322 |
| 4,379,104 | 4/1983 | Koorevaar. | |
| 4,387,071 | 6/1983 | Kirkhuff. | |
| 5,312,844 | 5/1994 | Gonsior et al. | 152/DIG. 18 |
| 5,346,231 | 9/1994 | Ho | 280/11.22 |

*Primary Examiner*—Geoffrey L. Knable
*Attorney, Agent, or Firm*—Fulwider Patton Lee & Utecht, LLP

[57] ABSTRACT

A pneumatic in-line skating wheel having a tire body and central hub chemically bonded during a polyurethane casting process and further including an annularly encapsulated air bladder centrally spaced within the tire body to provide shock absorption and inflation/deflation means such that the overall tire resiliency may be adjusted, enabling adjustable performance characteristics of the wheel.

14 Claims, 2 Drawing Sheets

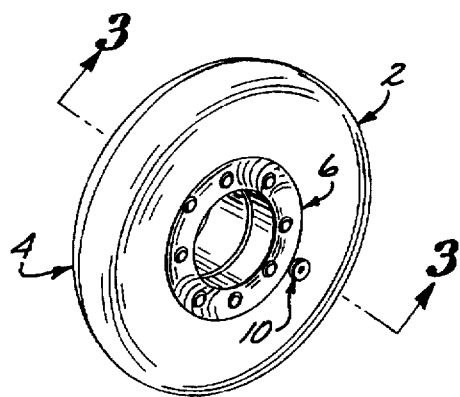
FIG. 1
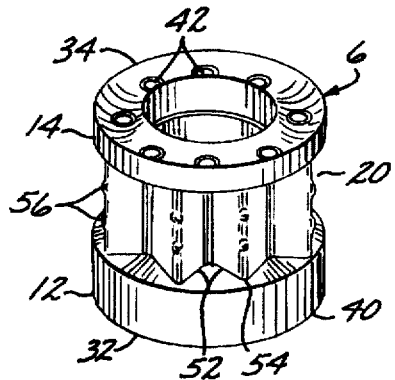
FIG. 2
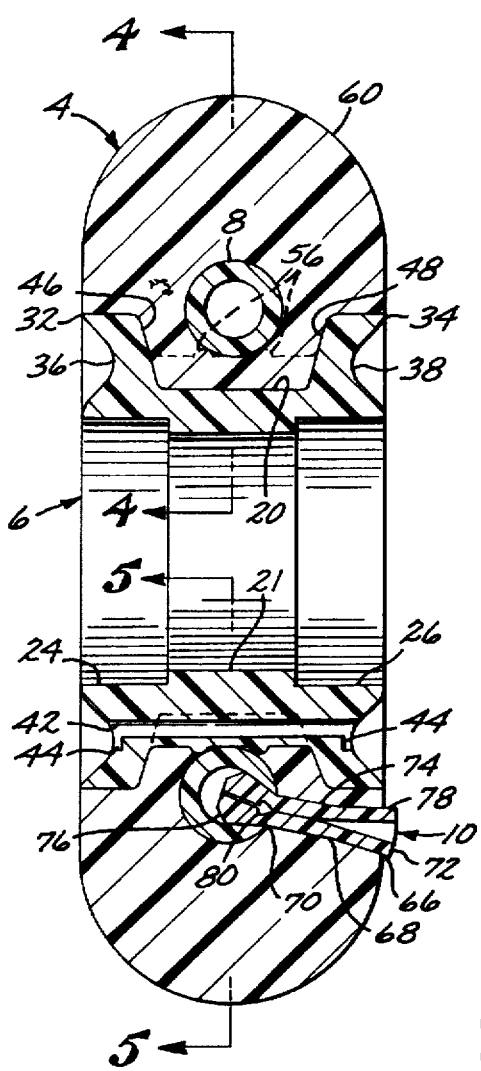
FIG. 3
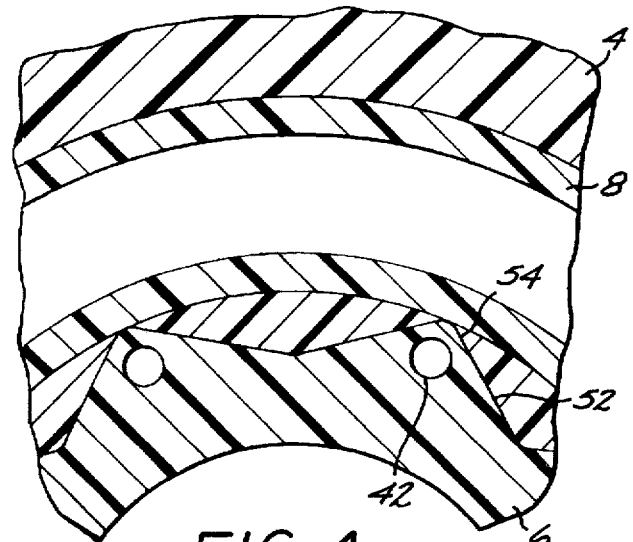
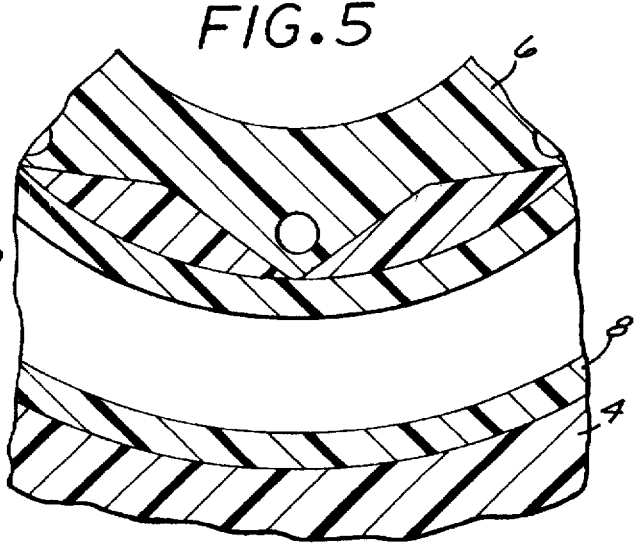
FIG. 4
FIG. 5

5,630,891

PNEUMATIC IN-LINE SKATE WHEEL

BACKGROUND OF THE INVENTION

1. Field of the Invention

The invention relates to in-line roller skates and more particularly to a pneumatic in-line skate wheel of integral construction with adjustable performance characteristics.

2. Description of the Prior Art

In-line roller skating combines the excitement of ice skating with the mobility of running. Enabling recreational access to a wide variety of surfaces, the sport allows an individual to traverse sidewalks, roads, and other rollable surfaces. In-line skating owes its name to the wheel configuration of the skate itself. Arranged longitudinally one behind the other, the wheels rotate in the same longitudinally oriented vertical plane, creating an experience similar to ice skating, where the blade resides in one longitudinal plane.

Wheels designed for in-line roller skating often include, generally, a hard plastic hub around which is mounted a soft elastomeric tire. Difficulties in preserving a permanent bond between the tire and hub have led to hub arrangements incorporating flanged rims to sandwich the tire sides. Such rims come in a variety of configurations including flat, slightly convex or V-shaped plates. The rims must securely fasten the tire in place while the wheel assembly undergoes the axial and lateral stresses associated with operation. Continued deformation of a tire during rotation tends to cause slipping and breakage from a wheel hub.

One solution to the hub to tire bonding problem proposed a hub to mechanically lock the tire in place. The hub incorporates two side plates clamped together to contain roller bearings in a track surrounding an axle and at the outer edge clamping against the opposite sides of an annular tire rib. A device of this type is disclosed in U.S. Pat. No. 1,618,496 to Ware. Although beneficial for its intended use, this design is unsatisfactory for present day high performance wheels requiring a positive lock of the tire in position.

Providing a hub and bearing assembly about an axle tube and circumscribed by annular rings, U.S. Pat. No. 1,697,485 to Ware, discloses a different solution to locking a tire to a hub. The annular rings are clamped at their radially outer extremities against the opposite sides of a tire configured with laterally disposed tire seats. Once again, this design, while beneficial, is unsuited for high performance in-line roller skating use.

A recently disclosed solution to the hub breakage problem incorporates a hub having a mounting flange with bores onto which the tire sits. Hub rims sandwich the tire to the mounting flange and hub bolts secure the tire to the annular rim and flange. Although well suited for in-line roller skating due to the structural rigidity brought about by this design, this arrangement fails to provide a structurally sound pneumatic tire arrangement.

The increase in popularity of in-line roller skating among people of all ages and sizes has necessitated the design consideration for a wheel having adjustable performance characteristics. In-line skating wheels generally come in one size with a predetermined tire resiliency. The performance of these tires depends upon many factors, including the skater's weight and skill level, the rolling surface and the weather. A skater's weight and skill level are fairly predictable, enabling the skater to select the proper performing tire to match those considerations. However, the rolling surface and the weather are often unpredictable, thus illustrating the need for a tire having adjustable performance characteristics.

Tire rotation along a surface is the result of friction acting tangent to the point of contact between a tire and a rolling surface, and opposite to the direction of an externally applied force upon the tire. The frictional force inhibits the tire from sliding across the surface thus causing the tire to roll. The magnitude of a frictional force is generally material dependent and proportional to the weight bearing down upon the point of contact. From a performance perspective, friction can be both an asset and a liability. As a positive characteristic, an increase in friction allows a tire to grip a surface more easily, enabling sharper cornering and wet weather use. On the negative side, an increase in friction equates to less speed along a surface. Therefore, it can be seen that a tire capable of adjustably influencing the amount of friction acting on it offers a user flexibility within the tire's performance spectrum.

Although speed and gripping capability are important performance characteristics for an in-line skating wheel, shock absorption is also an important criterion. Energy absorbed by a tire as a result of traversing bumps or rocks is prevented from shocking a users knees, thus avoiding a potentially dangerous situation. Skate wheels currently on the market exhibit a certain amount of resiliency within the tire such that a predetermined amount of shock absorption is available. This predetermined level of absorption is dependent upon a persons weight. Therefore, the need exists for an improved skate wheel capable of offering an adjustable levels of shock absorption protection for individuals of all weights and sizes.

Efforts to solve the problem of shock absorption within a skate wheel have been disclosed in several U.S. patents. These solutions contemplate shock absorbing elements within the tire such as hard or soft annular rings intended to create an annular void encased in the wall of one of such rings to provide some degree of shock absorption. Although beneficial in that a certain amount of protection is afforded, these designs prevent skaters from manually adjusting the level of shock absorption afforded by the wheel.

SUMMARY OF THE INVENTION

A hard, polyurethane hub formed with a pair of axially spaced retainer flanges which together form a drop-center. Received within the hub drop-center is a self distended annular hermetic bladder. Radially encapsulating the bladder and the hub periphery is an elastomeric tire comprised of a material similar to that of the hub but typically somewhat more resilient. In one embodiment, the radially formed tire further includes a tubular passage allowing access to the bladder. A highly resilient elastomeric tubular valve may be sealably inserted into the passage, with one end penetrating the bladder and the other end slightly extruding from the tire exterior surface. Due to the valve's resiliency with respect to the harder tire, the central portion of the valve is compressed together forming an airtight seal. A pressurizing device may access the valve port to inflate or deflate the bladder, causing a corresponding increase or decrease in the resiliency of the tire.

Having the ability to adjust the resiliency of the tire gives a skater the capability to vary the performance characteristics of the skate wheel. By deflating the wheel, the tire becomes more resilient to, when weighted, provide for greater contact area between the tire and the rolling surface for better traction. Such a characteristic is beneficial for rough, loose or wet surfaces where traction is of utmost concern. In addition, shock absorption capability would be increased. For operation over smoother support surfaces, the tire may be inflated to a higher pressure so the composite tire becomes less resilient to minimize tire squat thereby enhancing the load carrying capability and resulting in a smaller contact interface between the tire and the rolling surface. Thus the wheel will present less resistance to rolling on the support surface. Such a characteristic is important for competitive speed skating. In addition, manufacturing and inventory expenses can be dramatically reduced since one style of wheel would be adjustable to serve the performance requirements for a wide array of skaters of different physical characteristics and ability.

The wheel is fabricated by incorporating open-cast molding techniques into the assembly thereof. First, the bladder is looped into the hub drop-center and centered within an annular array of locator nipples. The resulting hub subassembly is placed into a mold having an ellipsoidal cavity corresponding to the eventual shape of the tire. In one embodiment, the mold includes a removable axially extending frusto conical needle to form the valve passageway within the tire to be formed. Once enclosed within the mold, high temperature liquid urethane is introduced, filling the ellipsoidal cavity enclosing the bladder and hub drop-center area. The exothermic curing process heats the air within the bladder causing it to expand thus distending the walls of such bladder causing it to more firmly grip the drop center to cooperate in holding such bladder centered as the curing process continues. The bladder is preferably also of polyurethane material to also chemically bond to the tire body to cooperate in forming a structurally integral system. The compatibility of the hub material and the tire material causes the high temperature urethanes to form a virtually unbreakable bond between the tire and hub flanges during the curing process. Following the curing process, the bladder may be punctured and a tubular valve inserted into the passage created by the mold needle.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 1 is a perspective view of an in-line roller skate wheel of the present invention;

FIG. 2 is a perspective view of a hub incorporated in the skate wheel shown in FIG. 1;

FIG. 3 is an enlarged transverse sectional view taken along line 3—3 of FIG. 1;

FIG. 4 is a further enlarged partial sectional view taken along line 4—4 of FIG. 3;

FIG. 5 is a further enlarged partial sectional view taken along line 5—5 of FIG. 3;

DETAILED DESCRIPTION OF A PREFERRED EMBODIMENT

Figure 6:
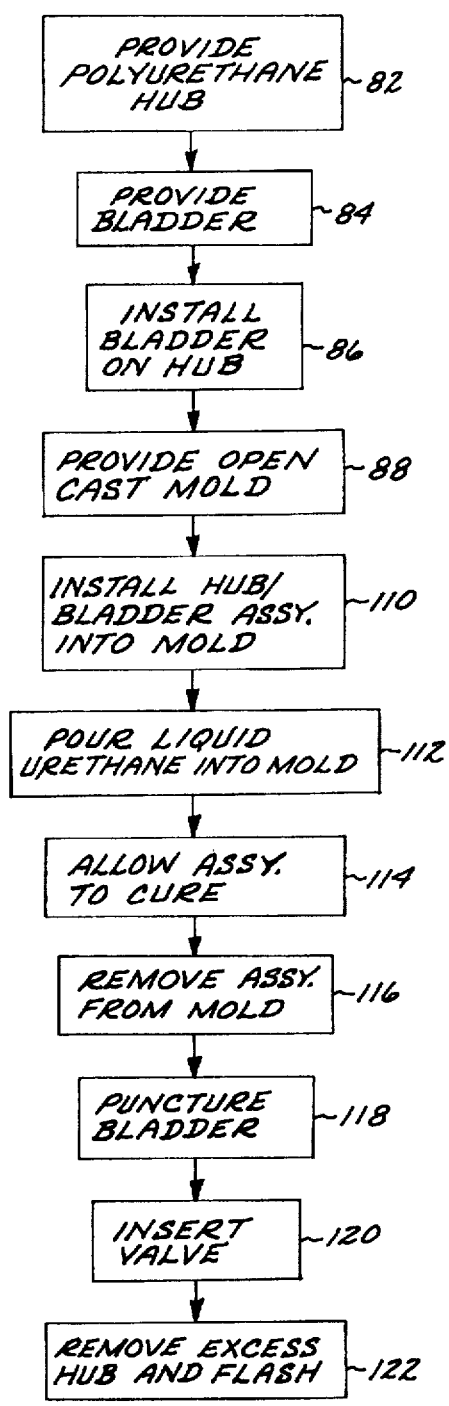
FIG. 6 is a block diagram illustrating a preferred method of manufacturing the skate wheel shown in FIG. 1.

Currently available in-line roller skate wheels generally comprise a hard plastic hub surrounded by a tough polyurethane tire body. Various flanging arrangements exist to help keep the tire from breaking away from the hub and exposing the skater to potential injury. The tire body is designed to a predetermined resiliency and reflects a specific band of performance parameters for proper operation under certain conditions. Such conditions include, speed, cornering and shock absorption characteristics. Skaters desiring different performance characteristics have in the past been forced to change skate wheels to achieve satisfactory results. The present invention enables a skater to vary the performance parameters of a skate merely by adjusting the pressure in an air chamber within the tire of a skate wheel. In addition, the present invention incorporates a novel bonding technique designed to positively hold a pneumatic wheel on its hub to thus protect the skater from potential injuries arising out of tire separation.

As shown in the drawings for purposes of illustration, the invention in a preferred embodied is a pneumatic in-line skating wheel 2 with an adjustably resilient tire 4 annularly encasing an integrally bonded hub 6. Encapsulated within the tire is an annular air bladder 8 centrally spaced. A valve 10 positioned within the tire allows access to the air bladder for inflation or deflation thereof. The wheel assembly is fabricated using open-cast molding techniques with the hub and tire formed from materials known to form strong chemical bonds when sufficiently heated. During the molding and curing processes, an exothermic reaction within the air bladder is conveniently employed to distend the bladder causing it to firmly embrace the drop center of the hub. Hardness differentials between the valve and the tire provide for hermetic sealing of the assembly without the need for additional seals or gaskets.

The hub is constructed of hard polyurethane, typically having a durameter index of 65D and includes a central axle bore 21 configured at its opposite ends with countersunk cylindrical bearing assembly cavities 24 and 26 configured to receive the outer races of respective bearing assemblies for riding on the skate axle. The hub is formed with axially spaced apart, radially projecting flanges 12 and 14 which radiate outwardly from a drop center 20 angling outwardly along radially and axially outwardly tapered surfaces 46 and 48 to then turn axially outwardly to form radially outwardly facing flat bead seats 32 and 34. Conveniently, the axial exterior surfaces of the flanges 12 and 14 are configured with annular indentations configured concentric with the axle and axially indented 36 and 38.

The drop center is formed with a peripheral configuration of somewhat of a sawtooth shape to define angularly shaped stand off ribs defining spokes 52 radiating outwardly to respective stand off apexes defining support tips 54.

Formed on the respective support tips are axially spaced apart positioning nubs 56 (FIG. 2) which serve in practice to center the bladder during the molding process as will be described hereinafter.

The stand off spokes 52 are conveniently formed with axially projecting open ended bores 42 disposed equidistant thereabout and countersunk on their opposite ends 44 for receipt of axially projecting screws (not shown).

It will be appreciated that the hub is integrally formed of a single piece of hard polyurethane having high strength properties. The material used to form the hub is carefully chosen to produce the highest degree of bonding strength during the fabrication process with the tire body. A preferred embodiment of the present invention uses thermoplastic polyurethane (TPU) as the material of choice. It will be appreciated that careful selection of the proper polyurethane materials to form the hub and the tire will create a permanent high temperature bond during the fabrication process without the need for any extraneous bonding means such as epoxies or glues. Such a bond created between the two components virtually results in a single integrally formed unit.

Referring to FIGS. 3 and 4, the bladder 8 is constructed of approximately 60A durometer thermoplastic polyurethane to give it a soft, toroidal, self-distended shape to embrace the tips 54 of the hub ribs spokes 52 located axially between arrayed pairs of locator nipples 56 projecting therefrom. Sitting annularly within the drop-center 20, the bladder exterior is completely exposed except for the points of contact with the hub spokes. Due to the triangular shape of the teeth, only the tip of each spoke contacts the bladder, thus keeping the unexposed portions of the bladder to a minimum. It will be appreciated that this degree of exposure will provide, except for the respective contact points, a relatively complete encapsulation of the bladder within the tire body and simultaneously provide bonding with the polyurethane material of such bladder as well as to the surface area between the tire body and the hub to form a structurally integral system. It will further be appreciated that a predetermined volume of air is trapped within the bladder to cooperate with the wall thereof to provide sufficient ambient pressure to keep the bladder self distended and to expand upon heating during the wheel fabrication process such that the bladder maintains a constant position around the hub. As will be understood by those skilled in the art, the bladder itself may be constructed of a material such that the wall thereof will provide sufficient structural integrity to be self distending.

Referring to FIGS. 1 and 3, the tire body 4 is toroidally formed from a resilient thermoset polyurethane material, such as an MDI based polyurethane, to be chemically similar to the hub material. Due to the fabrication process described hereinafter involved in the molding the tire body, the inner diameter of the tire body at the drop center 20 and the radial walls at the flange surfaces 46 and 48 bond positively to the hub to completely encapsulate the bladder between the tire and hub to form an air retaining capsule independent of the subsequent integrity of the bladder itself.

Formed to project axially and radially outwardly in the tire body 4 is a valve bore 66 having an outwardly opening frusto conically shaped passage 68. The passage extends from the tire body exterior 60 to the upper surface of the encapsulated bladder 70. Received within the passage is an elastomeric, open ended tubular valve 72 constructed of a more resilient urethane than the tire body and formed with a narrow compressible neck 74 to be compressed radially inwardly by the more rigid tire body. The cross section of the valve is oversized with respect to the passage so that the softer material will be compressed by the polyurethane tire body. One end 76 of the valve penetrates into the bladder 8, which is accessed during the fabrication process. The other end 78 slightly protrudes from the tire body exterior for ease of access. Midway through the passage lies a slightly enlarged cavity 80 which opens up into the neck. The cavity serves to define the neck opening that undergoes compression within the tire body. It will be appreciated by those skilled in the art that the hardness differential between the tire body and the valve will normally compressibly close the valve at the neck, resulting in an airtight seal internally and externally. The bladder may be forcibly accessed using an appropriately hollowed needle for inflation or deflation of the bladder. Additionally, due to the hermetic construction of the tire body around the bladder, the air tight capacity of the wheel is not necessarily dependent on the bladder. Thus, various embodiments may integrate the bladder in the tire body.

It will be appreciated that the skate wheel of the present invention has adjustable performance parameters. By varying the amount of air within the bladder, speed, traction, and shock absorption characteristics of the skate wheel may be substantially altered. Inflation or deflation of the bladder correspondingly makes the tire body less resilient or more resilient. A stiffer, less resilient tire body translates into a faster, slicker, and bumpier ride. A softer, more resilient tire body translates into a slower, grippier and relatively shock resistant ride. Further, skaters of different sizes and weights may purchase the same wheels and adjust them respectively to achieve the same skating experience.

Figure 7:
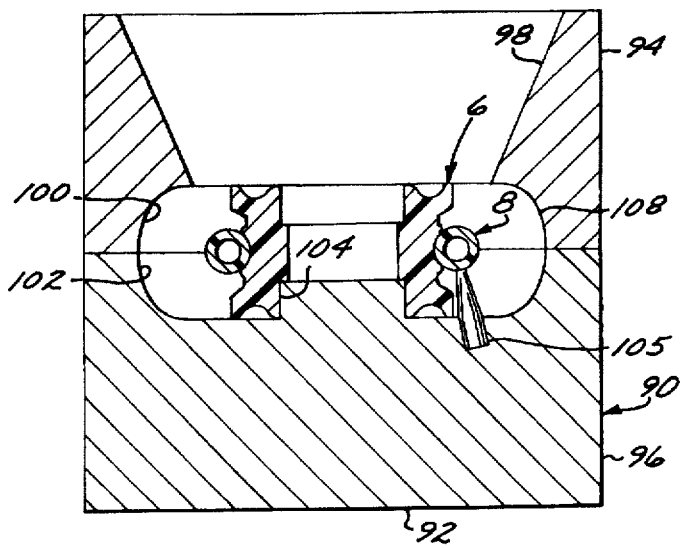
FIG. 7 is a cross sectional view, in enlarged scale, of the hub included in the wheel shown in FIG. 1 as nested in a mold.
Figure 8:
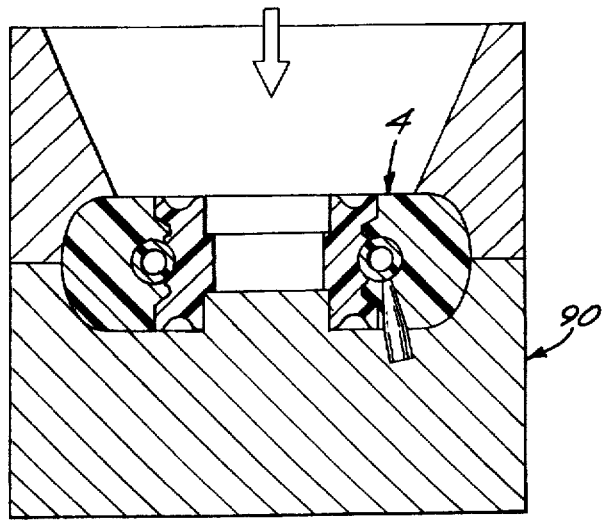
FIG. 8 is a cross sectional view similar to FIG. 7 but showing the tire molded on the hub.

FIGS. 6, 7 and 8 illustrate a preferred method of making the wheel and one form of mold that may be used for this purpose with occasional additional reference to FIGS. 1–3. According to the preferred method, a hard thermoplastic polyurethane hub 6 and a soft, elastic toroidal air filled bladder 8 are selected as at 82 (FIG. 6). The hub construction is important in that the material must be structurally rigid and such that it will afford a high integrity chemical bond with the material selected for the tire body. In a preferred embodiment, the bladder must be of a type having a hermetically sealed air filled annular cavity preferably formed of endless thermoplastic polyurethane rubber tubing. The bladder is selected at 84 and stretched over one of the flanges and looped around the hub drop center as at 86 and carefully aligned within annularly arrayed locator nub 56 which tend to maintain such bladder centrally located within the axial dimension of the drop center 20. It will be appreciated that such bladder, in some embodiments, may be constructed of a material with limited distensible characteristics so that it may be pre-pressurized so that it will inherently maintain the desired gaseous pressure therein to thus provide the desired tire performance characteristics without the necessity of valving.

An open-cast mold 90 is provided at 88 to form the tire body annularly around the resulting hub/bladder subassembly during the polyurethane casting operation. The mold includes a rectangularly formed housing 92 having upper and lower halves 94 and 96. The upper half 94 is formed with an upward opening frusto-conically shaped pour hole defining a gate 98 extending downwardly into a downwardly facing half toroidally formed cavity 100. The lower half is formed with an upwardly facing half toroidally formed cavity 102 having an upstanding cylindrical centering stub 104 disposed centrally therein. Such lower half further includes an upwardly opening blind bore 105 angling radially and axially inwardly for slip fit receipt therein of the base end of a tapered male valve passage mold pin 106 to maintain external access to the air cavity insert during the polyurethane casting operation. The two halves, when joined, form an enclosed toroidal chamber 108 with an access opening.

Upon installation of the bladder 8 around the hub 6 the resulting sub-assembly is placed centrally within the mold at 110.

The polyurethane casting operating continues with the pouring of a predetermined volume of liquid thermoset polyurethane into the conical opening 98 of the mold at 112. The urethane is at a temperature sufficiently elevated to allow high viscosity of the material. For the preferred embodiment, the polyurethane is maintained in a molten state at a temperature of about 140° C. to, when poured on the hub at room temperature, react with such hub to form the desired bond. Once poured, the liquid thermoset seeps around and into the communication channels formed between the hub drop center spokes 52 to form axial bridges disposed between the respective spokes. It will be appreciated that the spokes, by supporting the bladder 8 and forming therebetween seepage channels, provide a major bonding area radially about the hub drop center inwardly of the tire body and cooperate in forming an integral tire body enveloping nearly the entire periphery of the bladder. After the liquid thermoset is poured, a plug (not shown) may be inserted in the gate opening 98 to abut the formed bottom end thereof with the liquid polyurethane forming the sides of the tire to establish the desired finished form. The mold 90 is set aside to allow the assembly to cure as at 114 (FIG. 6).

During the curing process, which generally takes from one to three (hours), several important physical transformations take place which are critical to the present invention. First, following introduction of the hot liquid urethane, the air filled bladder 8 itself heats up, causing an expansion of the air within the bladder. The resultant exothermic reaction heats the entrapped air expanding the bladder to cause it to firmly grip the drop center 20 thereby maintaining such bladder distended and firmly centering it between the centering necks 56 (FIG. 3) to support it against dislodgement during the conclusion of the pour process and during the curing stage. The second transformation occurring during curing is the hardening of the thermoset polyurethane into the tire body. Most importantly, however, is the chemical bonding which takes place between the hub thermoplastic and the tire body thermoset during curing.

Formed of chemically similar materials, the hub 6, bladder 8 and the tire body 4 fuse together during the curing process, forming an integral unit. The high temperature of the liquid thermoset causes a microscopic layer of the hub thermoplastic to liquify and permeate into the adjacent thermoset. Likewise, the adjacent thermoset microscopically permeates into the thermoplastic. As the resulting mixture hardens, the previous hub to liquid urethane boundary is replaced by a fused integrally formed tire body and hub. It will be appreciated that the chemical bond formed between the bladder, hub and the tire body virtually fuses the components together into a single integral unit without the use of extraneous and potentially unreliable bonding agents. With the advent of adjustable performance wheels, and the increasingly harsher stresses associated therewith, a stronger and more reliable hub to tire bond is a necessity.

Following the curing process, the mold 90 is carefully opened, and the resulting wheel removed at 116. A needle-like tool is inserted into the valve passage so as to puncture the bladder at 118. Next, a tubular, soft valve 10 is installed on an insertion tool, and inserted at 120 into the valve passage 68. The valve is inserted far enough into the passage to allow access to the bladder interior. Since the valve is formed of a relatively soft polyurethane material, the harder tire body will act to compress the valve closed, thus effectively keeping the bladder sealed. However, the bladder may still be accessed for inflation or deflation by inserting a suitable tubular needle into the valve opening. In practice, it will be appreciated that the valve may be of any conventional type and, in some embodiments, where subsequent adjustments in pressure are not sought, will not be necessary.

Assembly of the pneumatic in-line skating wheel is completed following final trimming of the rough product at 122. Any excess urethane "flash" is trimmed to make the tire body smooth and free from rough edges. The wheel is now ready for installation onto an in-line roller skate.

In operation, it will be appreciated that the tire of the present invention will be mounted on a skate axle about a symmetrical center line between the bearing assemblies nested in the opposite sides of the axle bore 21. The tire may be inflated to the desired pressure by inserting a needle in the inflation valve 10 forcing the walls thereof open to introduce the tip of the needle into the bladder such that the pump may be actuated to inflate the bladder to the desired pressure. It will be appreciated that in the structure of this invention, the integrity of the wall of the bladder becomes less important during operation of the tire since, in the event the wall of such bladder should rupture, the pressure within the cavity defined by such bladder is still retained against escape because of the positive bonding of the tire against the drop center 20 and sealing flanges 46 and 48 and seats 32 and 34. Then, when the skate is loaded and force applied to the body of the tire, such force will be resisted in a manner proportional to the pressure in the cavity defined by such bladder. For heavier skaters, the cavity will be pressurized to a higher pressure so as to minimize squat of the tire under load. However, for lighter skaters, the pressurization needle may be inserted in the valve 10 to allow air to escape therefrom to thereby lower such pressure slightly and, if necessary, the bladder cavity repressurized. Then, with the lower pressure in the bladder cavity, when the skate wheel is loaded, there will be some tendency of the tire body to squat about the bladder cavity to thus provide for shock absorption and a smoother ride. Moreover, for more athletic skating activities, the squat and flexibility of the tire body may become more important in assuring a firm grip between the tire surface and the underlying support surface.

From the foregoing, it will be apparent that the pneumatic tire of the present invention provides a high integrity tire assembly in which the pressure in the pressure cavity may be easily adjusted and which will allow for the skate ride afforded by a pneumatic tire without the shortcomings normally associated with a pneumatic tire. Thus, the expense of fabrication and of inventorying numerous different tires of different physical characteristics is reduced.

Various modifications and changes may be made with regard to the foregoing detailed description without departing from the spirit of the invention.

What is claimed is:

1. A polyurethane cushioned pneumatic, in-line, roller skate wheel comprising:

a rigid urethane hub formed with a drop-center having axially spaced apart retainer flanges, said drop center defining a plurality of spokes disposed in annular spaced relation about the drop center and projecting radially outwardly;

an annular urethane bladder received between said flanges and formed with a relatively thin bladder wall defining a pressure chamber and supported on said spokes;

a relatively soft, molded urethane tire body formed with a radially inner portion between said flanges and bonded thereto, and further formed with a radially outward annular cushion, said cushion being relatively thick compared to said bladder wall and formed with a generally rounded in radial cross section tread surface;

said tire and bladder being further formed with a valve bore; and a valve in said bore for receipt of compressible pressurizing gas to adjust the pressure in said chamber to adjust the magnitude of shock absorption whereby said bladder may be pressurized so sharp forces applied radially inwardly on said tread surface will be cushioned by said cushion and tend to be absorbed by the compressible gas in said chamber.

2. A pneumatic, in-line, roller skate wheel according to claim 1 wherein:

said tire body is molded to substantially encapsulate said bladder and is bonded thereto.

3. An in-line, roller skate wheel comprising:

a relatively rigid urethane hub formed with a drop-center and axially spaced apart retainer flanges, said drop center including a plurality of spokes disposed equidistant about said drop center and configured to form therebetween axial communication channels, said spokes terminating in tips defining respective contact surfaces;

a tubular shock absorber bladder formed with a body annularly surrounding said drop center to form a gas chamber and supported on the respective said contact surfaces;

compressible gas in said chamber to pressurize said bladder; and a relatively soft molded urethane tire body nested in said drop center and formed to substantially surround said bladder and including axial support bridges in said communication channels, said tire body projecting radially outwardly from said tube to form an annular cushion constructed with a peripheral tread surface having a rounded cross section and further formed with laterally opposite sides bonded to said retainer flanges whereby sharp forces applied to said tread surface will tend to be cushioned by said annular cushion in cooperation with said compressible gas in said gas chamber.

4. A pneumatic, in-line, roller skate wheel comprising:

a rigid urethane hub formed with a drop-center and axially spaced apart retainer flanges;

said drop center including a plurality of stand off spokes disposed in annular spaced relation to project radially outwardly and form therebetween axial communication channels and terminating in respective tips defining contact surfaces;

an annular hermetic shock absorber bladder surrounding said drop center, formed with a body defining an annular chamber and supported on its radially inner surface from the respective said contact surfaces;

a relatively soft molded urethane tire body nested between said flanges and bonded on its axially opposite sides to said flanges, said tire body formed radially distally of said bladder with an annular cushion configured with a peripheral tread surface, said body being further formed to substantially envelope said bladder and defining axial support bridges projecting through the respective said communication channels;

said tire body and bladder being further formed with a bladder valve bore extending from said chamber to the exterior of said tire body; and a valve received within said bore whereby said chamber may be pressurized with compressible gas and said cushion will provide cushioned support of loads placed on said hub and flex under sharp forces applied radially inwardly to cooperate with said pressurized compressible gas in said chamber in absorbing said sharp forces.

5. A pneumatic, in-line roller skate wheel according to claim 4 wherein:

said stand off spokes are formed to project said contact surfaces axially and to each be configured with respective pairs of hubs spaced axially from one another; and said bladder is aligned axially between the respective said pairs of nubs.

6. A pneumatic, in-line roller skate wheel as set forth in claim 4 wherein:

said tire body is configured to form said bore with a reduced in diameter neck having a predetermined diameter; and said valve includes a resilient tube projecting through said bore and having a relaxed external diameter greater than said predetermined diameter so that said neck normally constricts the wall of said tube radially inwardly to normally maintain said tube closed.

7. A pneumatic, in-line, roller skate wheel as set forth in claim 6 wherein:

said tube, when received in and constricted by said neck, includes on its inner extremity an enlarged in cross section head disposed in said chamber to hold said tube in said bore.

8. A pneumatic, in-line, roller skate wheel according to claim 4 wherein:

said annularly spaced spokes are triangular in the plane perpendicular to the axis of said hub.

9. A pneumatic, in-line, roller skate wheel according to claim 4 wherein:

said valve is formed with an elongated tubular sealing neck configured so as to be radially constrained within said bore.

10. A pneumatic, in-line, roller skate wheel according to claim 4 wherein:

said hub is formed of thermoplastic polyurethane, said tire is formed of thermoset polyurethane, and said bladder is formed of thermoplastic polyurethane tubing.

11. An in-line, roller skate wheel as set forth in claim 4 wherein:

said bladder and tire body are constructed so the major radial extent of said tire body is disposed radially outward of said bladder.

12. An in-line, roller skate wheel as set forth in claim 4 wherein:

said hub is constructed of a urethane having a durometer index of substantially 65D.

13. An in-line, roller skate wheel as set forth in claim 4 wherein:

said bladder is constructed of a urethane having a durometer index of substantially 60A.

14. A pneumatic, in-line, roller skate wheel comprising:

a relatively rigid hub having an axis and including a drop-center wall, axially spaced apart retainer flanges and stand off spokes disposed in annular spaced relation about said axis and terminating in respective radially distal support surfaces;

an annular hermetic shock absorber bladder formed with a body defining a pressurized chamber, encircling said hub and supported on said support surfaces to cooperate in providing communication channels radially inward from said bladder between said spokes and projecting axially between said flanges;

a relatively soft molded urethane tire body between said flanges, said body formed to project through said communication channels and substantially envelope said bladder and further projecting radially distally of said bladder to form an annular shock absorption cushion defining a rounded axial cross section peripheral tread surface;

said tire body and bladder being further formed with a valve bore extending from said chamber to the exterior of said tire body; and a valve received within said bore for selectively receiving pressurizing compressible gas to adjust the pressure in said bladder to thereby adjust the shock absorbing pressure interposed between said spokes and said cushion.

* * * * *

UNITED STATES PATENT AND TRADEMARK OFFICE
CERTIFICATE OF CORRECTION

PATENT NO. : 5,630,891

DATED : May 20, 1997

INVENTOR(S) : Tom Peterson, et al.

It is certified that error appears in the above-identified patent and that said Letters Patent is hereby corrected as shown below:

Column 5, line 9, delete "ribs";

line 14, delete "teeth" and insert --spokes--.

Signed and Sealed this

Twenty-third Day of September, 1997

Attest:

BRUCE LEHMAN

*Attesting Officer*     *Commissioner of Patents and Trademarks*